Jan. 15, 1952

R. M. PAGE 2,582,271

WAVE FORM CONVERTER

Filed July 3, 1946

Inventor
ROBERT M. PAGE

By M. A. Hayes

Attorney

Patented Jan. 15, 1952

2,582,271

UNITED STATES PATENT OFFICE 2,582,271

WAVE FORM CONVERTER

Robert M. Page, Washington, D. C.

Application July 3, 1946, Serial No. 681,269

4 Claims. (Cl. 250—27)

(Granted under the act of March 3, 1883, as amended April 30, 1928; 370 O. G. 757)

This invention relates to an electrical system for converting a pulse type signal into a sine wave signal.

In the past, pulse to sine wave conversion circuits have ordinarily incorporated a filtering circuit adapted to be driven directly in response to the input pulse signal. In this event the waveform conversion factor (herein defined as the ratio of the amplitude of the sine wave output signal to that of the pulse input signal), is very low since the energy content of the fundamental frequency component, in a pulse waveform is inherently low. If however, as taught by the invention, the pulse signal is first transformed into a sawtooth signal, and the filtering circuit is driven thereby, the waveform conversion factor will be greatly improved and in general more satisfactory operating performance will result.

Figure 1:
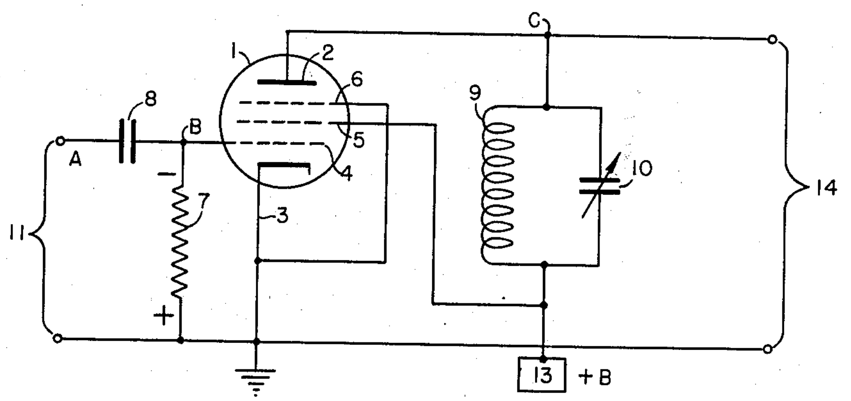
Figure 2:
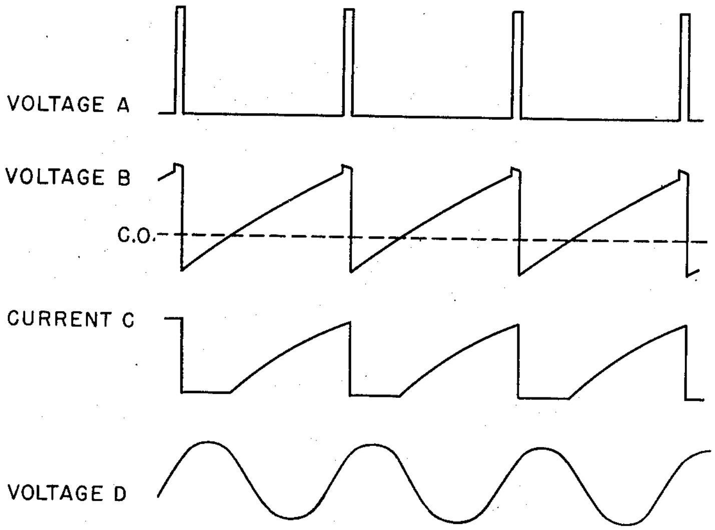

Other objects and features of the invention will become apparent upon a careful consideration of the following detailed description and accompanying drawings wherein:

Fig. 1 shows a schematic diagram of one exemplary embodiment of the invention, and Fig. 2 shows a series of waveforms illustrative of the operation of the circuit of Fig. 1.

Referring now to Fig. 1 there is illustrated an exemplary embodiment of the invention, comprising a vacuum tube component 1, and an antiresonant filter circuit including inductance 9 and capacitance 10. The filter circuit is shown, for purposes of illustration, as connecting the anode element 2 of the tube 1 to a source of positive operating potential 13. It being understood that the filter circuit can, if desired, comprise other arrangements of inductances and capacitances as can its connection in the circuit assume alternate forms without departing from the spirit of the invention. The input terminals to the circuit, across which the pulse signal which is to be converted is impressed are represented at 11, and are connected to the control grid 4 of tube 1 via capacitor 8 and grid return resistance 7. The latter is returned to the cathode of the tube so that the quiescent bias for the tube is zero. The output terminals of the circuit are shown at 14 taken across tube 1 itself.

In operation of the circuit the pulse signal train to be converted, is chosen to be positive in polarity as illustrated by waveform A of Fig. 2, and is impressed across the input terminals 11. The antiresonant circuit is tuned by capacitance 10, for example, to the repetition frequency of the input signal. During the existence of an applied pulse the potential at the grid, point B, rises slightly positive, as illustrated in waveform B, to cause grid current to flow and consequently to charge coupling condenser 8 negatively. Upon the termination of the input pulse, the negative travel of the input pulse drives tube 1 sharply and abruptly below cutoff. This action is illustrated in waveform B. The dotted horizontal line labeled C. O. and superposed on this waveform represents the potential level below which the tube is cut off. At this instant the quiescent current which normally flows through inductance 9 is terminated and the reproduction of the fundamental frequency component is initiated as illustrated in waveform D. Following the instant tube 1 is first rendered cut off, condenser 8 discharge through resistor 7 at such a rate as to return tube 1 to zero bias just prior to the next input pulse, thereby generating a saw-tooth current flow through the tube as illustrated by waveform C.

By selecting the time constant of resistance 7 and condenser 8 so that condenser 8 will return tube 1 to zero bias level just prior to the next successive input pulse, the sine wave signal D developed at the output of the filter, will have maximum amplitude and energy content. In other words the time required for condenser 8 to discharge completely should be approximately equal to the time interval between pulses.

Although I have shown and described only one certain and specific embodiment of the present invention, I am fully aware of the many modifications possible thereof. Therefore this invention is not to be restricted except in view of the prior art and the scope of the appended claims.

The invention described herein may be manufactured and used by or for the Government of the United States of America for governmental purposes without the payment of any royalties thereon or therefor.

What is claimed is:

1. A sine wave generator consisting of a single normally conductinug vacuum tube having at least a plate, a grid and a cathode, a circuit tuned to the desired frequency of the sine wave connected in the path of current flow through the tube, a source of positive, rectangular, pulse signals having a repetition frequency corresponding to the desired frequency of the sine wave, and coupling means feeding the positive, rectangular, pulse signals directly to the grid of the vacuum tube, said coupling means comprising a capacitance-resistance circuit having a time constant slightly less than the period between the pulse signals.

2. Means for converting a pulse type signal into a sine wave signal comprising a vacuum tube having at least, a plate, a grid, and a cathode, an antiresonant circuit tuned to the repetition frequency of the input pulse signal and connected in the path of normal current flow through said tube, and a resistance capacitance circuit comprising a resistance coupled between said cathode and said grid and a capacitance coupled between the input pulse signal and said grid, said resistance-capacitance circuit having a time constant such that the condenser will charge during the pulse and discharge substantially completely in the interval between pulses to thereby provide a sawtooth voltage at the grid of said tube, said sawtooth voltage having a portion of its oscillations below the cutoff value of the tube.

3. A sine wave generator comprising a normally conducting electron discharge device including a control electrode and a network in the plate circuit of said device tuned to a frequency corresponding to the desired frequency of said sine wave, means applying sawtooth wave forms of a frequency equal to the frequency of said network to said control electrode to drive said device beyond cut-off at the termination of each sawtooth wave form and to drive said device conducting during the next sawtooth wave form applied and means controlling the slope of the sawtooth waveforms to drive the control electrode to its normal bias at the termination of each of sawtooth waveform.

4. A sine wave generator comprising a normally conducting electron discharge device including a control grid and a network in the plate circuit of said device tuned to a frequency corresponding to the desired frequency of said sine wave, a resistance-capacitance circuit coupled to said grid, and means applying rectangular impulse signals having a repetition frequency corresponding to said desired frequency to said resistance-capacitance circuit, said resistance-capacitance circuit being responsive to said rectangular impulse signals for charging said capacitance during the period of each of said impulses and for discharging said capacitance during the interval between said impulses, said circuit having a time constant less than the time interval between pulses so that sawtooth wave forms at a repetition frequency equal to said desired frequency are applied to said grid to drive said device beyond cut-off at the termination of each sawtooth wave form and to drive said device conducting during the next succeeding sawtooth wave form.

ROBERT M. PAGE.

REFERENCES CITED

The following references are of record in the file of this patent:

UNITED STATES PATENTS

| Number | Name | Date |
|---|---|---|
| 2,323,905 | Goldmark | July 13, 1943 |
| 2,338,646 | Kessler | Jan. 4, 1944 |
| 2,414,486 | Rieke | Jan. 21, 1947 |
| 2,426,216 | Hight | Aug. 26, 1947 |
| 2,461,637 | Germany | Feb. 15, 1949 |